(12) United States Patent
Murayama et al.

(10) Patent No.: US 6,515,036 B2
(45) Date of Patent: Feb. 4, 2003

(54) METHOD OF DECOMPOSING A POLYURETHANE

(75) Inventors: Koichi Murayama, Osaka (JP); Katsuhisa Kodama, Osaka (JP); Takashi Kumaki, Osaka (JP)

(73) Assignee: Mitsui Takeda Chemicals Inc., Tokyo (JP)

(*) Notice: Subject to any disclaimer, the term of this patent is extended or adjusted under 35 U.S.C. 154(b) by 0 days.

(21) Appl. No.: 09/822,202

(22) Filed: Apr. 2, 2001

(65) Prior Publication Data

US 2001/0027246 A1 Oct. 4, 2001

(30) Foreign Application Priority Data

Apr. 4, 2000 (JP) .......................... 2000-101709

(51) Int. Cl.⁷ ........................... C08J 11/14; C08J 11/28; C08J 11/18; C08J 11/10; C07C 29/09
(52) U.S. Cl. ................. 521/49.5; 521/49; 564/437; 564/469; 564/488; 564/497; 564/498; 568/621; 568/623; 568/624; 568/854; 568/858; 568/868; 252/182.13; 252/182.24; 252/182.27
(58) Field of Search .................. 521/49, 49.5; 564/437, 564/469, 488, 498, 497; 568/621, 623, 624, 854, 858, 868; 252/182.13, 182.24, 182.27

(56) References Cited

U.S. PATENT DOCUMENTS 3,117,940 A * 1/1964 McElroy .................... 521/49.5
3,404,103 A 10/1968 Matsudaira et al. ........ 521/49.5
4,316,992 A * 2/1982 Gerlock et al. ............ 521/49.5

FOREIGN PATENT DOCUMENTS

| CA | 2116434 | 3/1993 |
| DE | 41 28 588 | 3/1993 |
| EP | 0 976 719 | 2/2000 |
| EP | 0 990 674 | 4/2000 |
| FR | 1 484 107 | 10/1967 |
| GB | 1093884 | 12/1967 |
| SU | 1669934 | * 8/1991 |

OTHER PUBLICATIONS

Patent Abstracts of Japan, Publication No. 11–080419, Published Mar. 26, 1999.

* cited by examiner

Primary Examiner—Rabon Sergent
(74) Attorney, Agent, or Firm—Wenderoth, Lind & Ponack, L.L.P.

(57) ABSTRACT

A method of recovering a decomposition product from a polyurethane, the method comprising the steps of thermally decomposing a polyurethane into a liquid containing a polyol and a urea compound which is soluble in the polyol, and solids containing a urea compound which is insoluble in the liquid in the presence of a polyamine compound at a temperature of 120 to 250° C.; removing the solids; hydrolyzing the residue with water retained at a high temperature of 200 to 320° C. and a high pressure; and recovering the resulting polyamine and/or polyol.

4 Claims, No Drawings

METHOD OF DECOMPOSING A POLYURETHANE

TECHNICAL FIELD

The present invention relates to a method of chemically decomposing the cuttings made in molding or fabricating articles of polyurethane resins and waste of such resin articles for industrially advantageous recovery of a polyamine compound and a polyol compound useful as the raw materials of the polyurethane resin.

BACKGROUND OF THE INVENTION

Polyurethane resins are widely used in large quantities as materials for flexible, semi-rigid or rigid urethane foams which are useful as cushion materials in sofas and like furniture or in beds and like beddings, in automotive seats and the like, as heat insulating materials in refrigerators, or as elastomers in shoe soles, tires, belts and the like. In recent years, methods of recycling or reusing articles of plastics, not excepting polyurethane resins, have been investigated because the protection of resources and preservation of the environment are considered more important. Known methods of recycling polyurethane resins include, if roughly classified, (1) a material recycling technique, (2) a chemical recycling technique and (3) an energy recycling technique.

The material recycling technique (1) is investigated on methods of reusing polyurethane resins as cushion materials by rebonding or compression molding of polyurethane foams and methods of using polyurethane resins by grinding foams and elastomers and incorporating the fragments as a filler into a new material.

The chemical recycling technique (2) includes methods of decomposing a polyurethane into the raw materials or into chemical compounds usable as the raw materials to make reuse thereof. The methods are known as a glycol decomposition method, an amine decomposition method or a hydrolysis method.

The energy recycling technique (3) is intended for recovery as heat or a vapor (steam) given off by using a polyurethane resin as a fuel.

The technique (1) poses a problem as to the quality of obtained product and is unavoidably applied only for limited purposes. It was suggested that the technique (3) will involve a risk of raising a new pollution problem on the generation of a detrimental substance by combustion of a polyurethane resin.

If the chemical recycling technique (2) is economically and industrially feasible, it may be an ideal recycling technique since the recovered compounds find wide applications.

However, the glycol decomposition method and the amine decomposition method comprise breaking urethane bonds with a glycol or amine compound, the urethane bond being relatively susceptible to decomposition among a variety of bonds present in the polyurethane resin such as urethane bonds, urea bonds, biuret bonds and allophanate bonds, followed by liquefaction of urethane bonds by exchange reaction. In the methods, the glycol or amine compound used as the decomposer newly generates urethane bonds and urea bonds which are included as a urethane or urea derivative into the liquid decomposition product.

Consequently according to the technique (2), the polyurethane resin is not decomposed sufficiently to provide a polyol as the starting material of polyurethane resin and a polyamine compound as an intermediate of polyisocyanate so that the recycled material is used for limited applications.

JP-B-42-10634, JP-B-43-21079 and JP-B-48-5280 disclose recovery methods in which a urethane polymer is subjected to heat decomposition with an amine compound and an alkali metal or alkaline earth metal to recover a polyether and an amine derivative having an amino group converted from the isocyanate group of polyisocyanate, namely to recover the raw material of a urethane polymer. The disclosed methods necessitate removing and disposing of the salts derived from the alkali metal or alkaline earth metal. Further the methods give the decomposition product in the form of a liquid and entail a problem of taking a cumbersome separation procedure. Actually the methods have not been commercially applied yet since the recycled product can not be used as the raw material due to a small amount of amine present in the polyether. Therefore, there is a demand for developing a treatment method to be conducted subsequent to the decomposition with an amine.

The proposals include a method of hydrolyzing a polyurethane resin using water as a decomposer. For example, JP-A-54-70377 describes a method in which polyurethane foam is hydrolyzed in the presence of an alkali metal or an alkaline earth metal at a temperature of 300° C. using a heated water vapor (steam) at 0.4 to 10 atm. When a water vapor is used under such a low pressure, the reaction is retarded. Thus this method suggests that the presence of a catalyst is inevitable.

A method was recently reported for converting a high molecular weight compound to a low molecular weight compound using water retained at a high temperature and high pressure (WO 98/34904). This method may be worthy to be carried out if the urethane refuse used as the starting material in the method consists of a polyurethane resin alone and is free of non-hydrolyzable contaminants. However, the shredder dust from automotive seats is available in the largest quantities among the polyurethane resin-containing waste and contains a large quantity of cuttings of non-hydrolyzable contaminants such as fibers and leathers used as the surface layer materials (fabrics) for automotive seats. Therefore, insofar as the shredder dust is used as the material to be treated in the method, the hydrolyzate contains the contaminants remaining after the hydrolysis. For removal of the contaminants from the hydrolyzate, it becomes necessary to filter the hydrolyzate after the reactor is returned to a normal pressure. Consequently it is difficult to continuously perform the hydrolysis.

However, polyurethane resins are hydrophobic and are usually mixed with fibers to provide a composite material. For example, the shredder dust from automotive seats is unavoidably provided as mixed with a fibrous material used as the surface layer material. If this method is conducted in a batchwise manner, the hydrolysis must be performed at a high added water ratio (ratio of water/compound to be hydrolyzed) for the decomposition of a bulky foam article. Consequently large-size high pressure equipment is required so that the method incurs a high energy cost and is uneconomical.

A continuous operation is considered necessary, of course, for compacting the equipment and for enhancing the energy efficiency. Even if a continuous supply is enabled, the hydrolysis needs a prolonged period because of hydrophobicity of polyurethane resin, and the largest problem arises as follows. When articles of polyurethane resin contain contaminants such as fibers and cloths as in the case of the foregoing shredder dust, the pressure regulating valve may be clogged with the contaminants and the valve disk may be blocked therewith so that the state of liquid layer may not be held at a high temperature and a high pressure. To overcome this problem, liquefaction may be required prior to taking a hydrolysis procedure.

JP-A-11-80419 discloses a method in which the refuse of polyurethane is hydrolyzed in a closed state in the presence of water in a larger amount than saturated water vapor to give a water-soluble product, which is then subjected to supercritical hydration decomposition. This method practically requires an organic alkaline compound because the reaction is retarded due to the presence of water alone and is inefficient. Further, pressure must be applied because of reaction in a closed state, and limitation is imposed on the equipment.

The prior patent application filed by the same applicant as in the present application (Japanese Patent Application No.11-263424) proposes a method of decomposing a polyurethane resin for recovery of components, the method comprising the steps of dissolving a polyurethane resin in a solubilizing agent such as a polyamine compound, a low molecular weight glycol or an amino alcohol, removing the insolubles when so required, hydrolyzing the solution with liquid water retained at 200 to 320° C. and recovering the polyamine compound and/or polyol compound thus obtained. However, according to this method, the polyurethane resin is completely dissolved in the solubilizing agent, optionally the contaminants such as fibers and leathers are removed, and the obtained solution is hydrolyzed with liquid water. The method presents a problem of using a large amount of a solubilizing agent such as a polyamine compound, a low molecular weight glycol or an amino alcohol, relative to the polyurethane resin to be decomposed, and resulting in low efficiency. A further problem is that because of dissolution of the entire substances, isolation and purification are performed with a low efficiency.

SUMMARY OF THE INVENTION

An object of the present invention is to provide a method of decomposing a polyurethane resin into a polyol compound and a polyamine compound useful as an intermediate of a polyisocyanate compound, i.e. the raw materials of the polyurethane resin, the polyurethane resin being capable of being completely decomposed even at a low added water ratio (ratio of water/compound to be hydrolyzed) in a short time.

The present invention provides a method of decomposing a polyurethane, comprising the steps of thermally decomposing a polyurethane in the presence of a polyamine compound at a temperature of 120 to 250° C., and separating the decomposition product into a liquid containing a polyol and a urea compound which is soluble in the polyol, and solids containing a urea compound which is insoluble in the liquid.

The present invention also provides a method of recovering a decomposition product from a polyurethane, the method comprising the steps of thermally decomposing a polyurethane into a liquid containing a polyol and a urea compound which is soluble in the polyol, and solids containing a urea compound which is insoluble in the liquid in the presence of a polyamine compound at a temperature of 120 to 250° C.; removing the solids; hydrolyzing the residue with water retained at a high temperature of 200 to 320° C. and a high pressure; and recovering the resulting polyamine and/or polyol.

The present invention also provides a method of recovering a decomposition product from a polyurethane, the method comprising the steps of thermally decomposing a polyurethane into a liquid containing a polyol and a urea compound which is soluble in the polyol, and solids containing a urea compound which is insoluble in the liquid in the presence of a polyamine compound at a temperature of 120 to 250° C.; adding a polyamine compound to the solids to dissolve the solids in the polyamine compound; removing the insolubles when so required; hydrolyzing the residue with water retained at a high temperature of 200 to 320° C. and a high pressure; and recovering the resulting polyamine and/or polyol.

The present invention also provides a method of decomposing a polyurethane, comprising the steps of thermally decomposing a polyurethane into a liquid containing a polyol and solids containing a urea compound which is insoluble in the liquid in the presence of a small amount of a polyamine compound at a temperature of 120 to 250° C., and separating them into the liquid and the solids.

The present invention also provides a method of recovering a decomposition product from a polyurethane, the method comprising the steps of thermally decomposing a polyurethane into a liquid containing a polyol and solids containing a urea compound which is insoluble in the liquid in the presence of a small amount of a polyamine compound at a temperature of 120 to 250° C., separating them into the liquid and the solids, and adding a polyamine compound to the above solids to dissolve the solids in the polyamine compound; removing the insolubles when so required; hydrolyzing the residue with water retained at a high temperature of 200 to 320° C. and a high pressure; and recovering the resulting polyamine.

DETAILED DESCRIPTION OF THE INVENTION

The present inventors conducted an extensive research on methods for continuous decomposition of polyurethane resins for recovery of components and found the following. The polyurethane resin is dissolved in a polyamine compound and an insoluble precipitate is easily removed by filtration or the like. Then the solution is continuously supplied to a water tank kept at a high temperature and a high pressure. On the other hand, the insoluble precipitate is heated, dissolved in a polyamine compound and continuously supplied in a liquid form to said water tank kept at a high temperature and a high pressure. In this way, the polyurethane resin can be completely decomposed in a short time even at a low added water ratio (ratio of water/compound to be hydrolyzed) into a polyol compound and a polyamine compound as an intermediate of a polyisocyanate compound, namely into the raw materials of the polyurethane resin.

The polyurethane resin to be decomposed in the invention is a polymer which can be prepared by reacting a polyisocyanate compound with an active hydrogen compound.

Examples of the polyisocyanate compound are those having 2 to 3 isocyanate groups and isocyanate equivalence of 80 to 140, such as toluene diisocyanate (TDI), diphenylmethane diisocyanate (MDI), polymeric MDI, hydrogenated MDI, modified MDI, isophorone diisocyanate (IPDI), hexamethylene diisocyanate (HDI), xylene diisocyanate (XDI), and hydrogenated XDI. Among these preferable are TDI, MDI and polymeric MDI, and especially preferable is TDI.

A polyol compound is typical of active hydrogen compound. Examples of the polyol compound are polyether polyol having 2 to 8 functional groups and OH number of 20 to 500 mgKOH/g which is prepared from alkylene oxide such as ethylene oxide or propylene oxide, and an active hydrogen-containing initiator; polyester polyol; and acryl polyol. Especially preferable is polyether polyol.

The method of the present invention is feasible for decomposition of any polyurethane resins having bonds such as urethane bond, allophanate bond, urea bond, biuret bond and amide bond, irrespective of molecular structure, structural units and degree of polymerization.

Products of polyurethane resins to be decomposed in the present invention include defective articles and the cuttings made in molding or fabricating articles of flexible, semi-rigid or rigid polyurethane foams as cushion materials in beds, sofas, chairs and the like to be used in households or offices, or in automotive articles such as seats, head rests, sun-visors, internal panels, armrests and the like; waste of such articles; the cuttings made in manufacturing articles of polyurethane resin elastomers such as tires, tubes and shoe soles; and waste of these articles. Especially preferable are products of flexible polyurethane foam.

When foam products are decomposed in the practice of the invention, it is preferred to shred the foam products by a shredder or the like, or in the case of elastomer products being decomposed, the products are desirably crushed by a crusher or the like. These products may contain minor quantities of fibers, leathers, synthetic leathers, metals and the like which are constituent materials of foam products.

Polyamine compounds for use herein as a solubilizer for polyurethane resins include not only amines generally useful as the raw material of polyurethane resins, typically toluenediamine, but also diaminodiphenylmethane, polymethyl polyphenyl polyamine, and mixtures thereof. Especially preferable is toluenediamine.

The amount of polyurethane resins relative to the polyamine compound is the same as or larger than the polyamine compound in terms of weight ratio, suitably about 2 to about 10 times, or preferably about 2 to about 3 times, the amount of the polyamine compound. That is, a far larger amount of polyurethane resins than polyamine compounds can be decomposed according to the present invention. If the polyurethane resin is decomposed in 0.5 times the amount of polyamine compound, the insolubles are not produced in the reaction and the whole solution is solidified at room temperature, raising an operational problem.

However, when a polyurethane resin is dissolved in a small amount of a polyamine compound to the utmost extent and then decomposed at an elevated temperature, the polyamine compound is migrated as an urea to the solids, resulting in the decomposition product containing a light-colored liquid substantially consisting of a polyol. In this case, the amount of the polyurethane resin relative to the polyamine compound is about 3 to about 10 times, preferably about 3 to about 7 times the amount of the polyamine compound in terms of weight ratio although variable depending on the kinds of polyamine compound and polyurethane resin to be used.

The polyurethane resin is decomposed with a polyamine compound at a temperature of 120 to 250° C., preferably 150 to 200° C. If the temperature is lower than said range, it takes a longer period of time until completion of decomposition. On the other hand, if the temperature is higher than said range, the polyamine compound is caused to decompose or polymerize, resulting in a lower recovery ratio.

When a polyurethane resin is used in about 2 to about 3 times the amount of a polyamine compound, the liquid of the decomposition product comprises a polyol and a urea soluble in the polyol and may further contain small amounts of undissolved, urethane bond-containing polyol and polyamine as the solubilizing agent.

On the other hand, when a polyurethane resin is used in about 3 to about 10 times the amount of a polyamine compound, or in other words when a large amount of a polyurethane compound is dissolved in a small amount of a polyamine compound to achieve thermal decomposition, the liquid obtained as the decomposition product substantially consists of a light-colored polyol, and thus a re-usable polyol can be recovered without undergoing hydrolysis as an additional step at a high temperature and under a high pressure.

The solids obtained by decomposition may contain a urea insoluble in the liquid, and contaminants contained in the polyurethane resin to be decomposed, such as fibers, organic fillers and the like. These solids can be easily separated from the polyol by filtration or like means.

When required, the liquid obtained from the polyurethane resin is filtered to remove the insolubles and contaminants such as fibers and the like. Then the residue is transported to a hydrolysis device. The insolubles are thermally dissolved again in a polyamine compound and the solution is transported to the hydrolysis device optionally after removal of insolubles and contaminants such as fibers. When the insolubles are dissolved in a polyamine compound, the temperature is in the range of 120 to 250° C., preferably 150 to 200° C. If the temperature is lower than said range, it takes a longer period of time until completion of decomposition. On the other hand, if the temperature is higher than said range, the polyamine compound is caused to decompose or polymerize, resulting in a lower recovery ratio. The amount of the polyamine compound to be used can be any in which the insolubles have been confirmed to become dissolved in the polyamine compound. A preferred ratio by weight of the polyamine compound to the insolubles is 0.5–2:1. If the ratio is less than 0.5:1, a larger amount of the insolubles would remain, whereas if the ratio is more than 2:1, an increased amount of polyamine compound would not contribute to the dissolution, leading to a significantly lowered efficiency.

Specific examples of the filter to be used herein are automatic filter press, rotary-disc filter devices, and centrifugation type filter devices which are provided with filter cloth made of teflon, polyphenylene sulfide or glass fibers, metal gauze formed from SUS, a ceramic filter or the like.

Hydrolysis devices to be used herein are not structurally limited. Preferred examples of useful hydrolysis devices include those so designed that the solution of polyurethane resin is mixed with heated water at a column bottom, the mixture is moved upwardly to a column body, and the hydrolyzate and the carbon dioxide gas generated are continuously discharged outwardly from the column via a pressure control valve arranged at a column top. In short, the structure of hydrolysis device should assure application of pressure for maintaining the temperature of heated water required for the hydrolysis and should assure a period of time for flow of liquid which is required for the hydrolysis.

The hydrolysis proceeds at a temperature of 200 to 320° C., preferably 240 to 300° C. If the temperature is lower than said range, the decomposition is retarded. On the other hand, if the temperature is higher than said range, there occur side reactions such as breakage of polyether chain and condensation of polyamine compound thus produced. Although the pressure applied in this step does not directly affect the yield of the obtained product, it is preferred to control the pressure at a level which is sufficient to retain the heated water in the liquid form. The weight ratio of heated water to liquid to be hydrolyzed is 0.3–5.0:1, preferably 0.5–3.0:1 although variable depending on the type of polyurethane resin to be decomposed. If the ratio is lower than said range, the polyurethane resin incompletely decomposes into a polyamine compound and a polyol compound, whereas in the case of the ratio being higher than the range, a larger-size device is required and greater energy loss is involved, leading to uneconomical operation. While the reaction can proceed in the absence of a catalyst, a small amount, for example about 0.001 to 0.1 wt. % based on the polyurethane resin of alkali metal hydroxide, ammonia or the like can be used as a catalyst. It takes about 5 minutes to about 2 hours, preferably about 10 minutes to about 1 hour to complete the hydrolysis.

Then the hydrolyzate is led to a dehydrating device. Predominant amounts of water and carbon dioxide gas are vaporized due to reduction of pressure by a pressure control valve and are recovered as the gas. When required, the obtained gas may be dewatered by means such as distillation under reduced pressure or blowing dry nitrogen.

The obtained hydrolyzate, which is practically a mixture of a polyamine compound and a polyol compound, can be separated into a polyamine compound and a polyol compound by conventional means such as distillation, centrifugation or extraction of solvent. A suitable separation procedure is selected according to the kind of polyurethane resin to be decomposed. Treatment with propylene oxide or like alkylene oxide for conversion of amino terminal group to hydroxyl group enables utilization as a polyol compound without separation of polyamine compound from the hydrolyzate.

The polyamine and polyol obtained by the method of the invention are the same compounds as the raw materials to be usually used in preparing a polyurethane, and can be used by themselves as the raw materials of a polyurethane resin because they are similar or superior to these raw materials in purity and quality.

The urea-containing solids obtained as an insoluble in the invention can be used as a crosslinking agent for various resins or as a reactive filler.

The present invention will be described in more detail with reference to the following examples to which, however, the present invention is not limited at all.

EXAMPLE 1

A 150 g quantity of toluenediamine was charged into a 4-necked, 1000-ml flask equipped with a thermometer, a stirrer and a nitrogen inlet tube and was heated to 200° C. Gradually added to the liquid were the cuttings of soft polyurethane foam having a density of 25 kg/m$^3$ which was prepared by foaming polypropylene triol (3000 in molecular weight) and toluene diisocyanate (Takenate 80, product of Takeda Chemical Industries, Ltd.) to give a solution. With the addition of 150 g of polyurethane foam, a precipitate was formed and was increased with continuous addition of the foam. A total of 400 g of polyurethane foam was added and subjected to a reaction for 1 hour, and eventually for a total of 6 hours at 200° C. The reaction mixture was cooled to 25° C. and was filtered with 100-mesh metal gauze to give 250 g of a solution and 270 g of the residue. The solution had a viscosity of 2500 mPa·s(25° C.), and the acetyl equivalent was 150 mgKOH/g.

The residue was found to contain a polyurea by gel permeation chromatography and NMR.

EXAMPLE 2

The solution (40 g) obtained in Example 1 and 60 g of pure water were charged into a 200-ml autoclave equipped with a thermometer and a pressure gage. The air in the autoclave was replaced with nitrogen gas and was heated to 270° C. At that time, the internal pressure was 6.7 MPa. The increase of pressure was not detected although the autoclave was left to stand at the same temperature for 20 minutes. The autoclave was cooled to room temperature. The contents of the autoclave were diluted with methanol and analyzed by GPC with the result that concerning the polyol portion, no polymer was detected except the peak corresponding to triol having a molecular weight of 3000 while in the amine region, only the peak corresponding to toluenediamine was detected. The NMR analysis confirmed that no urethane bond existed in the reaction product. These facts ascertained that the polyurethane foam was completely decomposed into toluenediamine and polypropylene glycol.

EXAMPLE 3

A 200 g quantity of toluenediamine was added to 270 g of the residue obtained in Example 1 and the mixture was heated to 200° C. to dissolve the residue in the diamine for recovery of 460 g of a solution. The solution was hydrolyzed in the same manner as in Example 2 with water retained at a high temperature and a high pressure in the autoclave. The obtained hydrolyzate was found by NMR to be toluenediamine.

EXAMPLE 4

With use of the same device as used in Example 1, 150 g of toluenediamine and 400 g of the cuttings of molded foam (density of 50 kg/m$^3$) useful for automotive seats and prepared by foam molding of polyether triol (with terminals activated with ethylene oxide) and toluene diisocyanate were gradually added to undergo a reaction at 200° C. for 10 hours. The reaction mixture was cooled to 25° C. and filtered with 100-mesh metal gauze, whereby 380 g of the solution and 110 g of the residue were obtained. The solution had a viscosity of 3400 mPa·s (25° C.), and the acetyl equivalent was 190 mgKOH/g.

EXAMPLE 5

The solution (30 g) obtained in Example 4 and 70 g of pure water were heated in the same manner as in Example 2 in a 200-ml autoclave equipped with a thermometer and a pressure gage. Then, the mixture was left to stand at 290° C. for 30 minutes. At that time, the pressure was made constant at 4.9 MPa. The autoclave was cooled to room temperature. The contents of the autoclave were analyzed in the same manner as above with the result that no urethane bond existed in the reaction product. GPC analysis shows that the detected peak corresponded to toluenediamine and polyether polyol used as the raw material.

EXAMPLE 6

Toluenediamine (100 g) was added to 110 g of the residue obtained in Example 4. Then the mixture was heated to 200° C. to dissolve the residue in the toluenediamine for recovery of 150 g of the solution. The solution was hydrolyzed in the autoclave with water retained at a high. temperature and a high pressure in the same manner as in Example 5. NMR confirmed that the hydrolyzate was toluenediamine.

EXAMPLE 7

A 100 g quantity of toluenediamine was charged into a 4-necked, 1000-ml flask equipped with a thermometer, a stirrer and a nitrogen inlet tube and was heated to 200° C.

Gradually added to the liquid were the cuttings of soft polyurethane foam having a density of 25 kg/m³ which was prepared in the same manner as in Example 1 to give a solution. With the addition of 150 g of polyurethane foam, a precipitate was formed and was increased with continuous addition of the foam. A total of 400 g of polyurethane foam was added and subjected to a reaction for 1 hour, and eventually for a total of 6 hours at 200° C. The reaction mixture was cooled to 100° C. and was filtered to give 240 g of a solution. The solution had a viscosity of 1200 mPa·s(25° C.), and the acetyl equivalent was 94 mgKOH/g. From this, an amount of amine in polypropylenetriol was 2 wt. % calculated as toluenediamine.

According to the invention, polyurethane resins can be completely decomposed in a short time into a polyol compound useful as the raw material of polyurethane resin and a polyamine compound, i.e. an intermediate of polyisocyanate.

According to the invention, the polyurethane resin can be continuously decomposed because the decomposition product is provided as a liquid and the contaminants can be easily removed. The separation into a polyamine compound and a polyol compound can be done to some extent prior to hydrolysis using water retained at a high temperature and a high pressure. Since the polyol compound assumes a liquid form at room temperature, the problem involved in supply of liquid can be substantially overcome. The sparingly polyol-soluble substance obtained in aminolysis can be eliminated prior to the hydrolysis using water retained at a high temperature and a high pressure, so that the polyol can be more, easily purified after hydrolysis. Further the present invention has a great advantage that a large amount of polyurethane resin can be decomposed relative to the pollyamine compound.

What is claimed is:

1. A method of recovering a decomposition product from a polyurethane, the method comprising the steps of:

thermally decomposing a polyurethane into a liquid containing a polyol and a urea compound which is soluble in the polyol, and solids containing a urea compound which is insoluble in the liquid, in the presence of a polyamine compound at a temperature of 120 to 250° C.;

removing the solids;

hydrolyzing the liquid with water at a temperature of 200 to 320° C. and under pressure sufficient to retain water in a liquid form, to form a mixture of a polyamine and a polyol;

recovering the polyamine and/or polyol from the mixture;

adding a polyamine compound to the removed solids to dissolve the solids in the polyamine compound;

removing insolubles from the dissolved solids;

hydrolyzing the dissolved solids with water at a temperature of 200 to 320° C. and under pressure sufficient to retain water in a liquid form, to form a polyamine; and recovering the polyamine.

2. The method according to claim 1, wherein the polyurethane is decomposed in an amount by weight which is equal to or greater than that of the polyamine compound.

3. The method according to claim 2, wherein the polyurethane is decomposed in 2 to 10 times by weight the amount of the polyamine compound.

4. The method according to claim 1, wherein the polyamine compound is toluenediamine.

* * * * *